United States Patent

[11] 3,604,959

| [72] | Inventor | Oded E. Sturman<br>Arleta, Calif. |
|---|---|---|
| [21] | Appl. No. | 885,098 |
| [22] | Filed | Dec. 15, 1969 |
| [45] | Patented | Sept. 14, 1971 |
| [73] | Assignee | Fema Corporation<br>Pacoima, Calif. |

[54] LINEAR MOTION ELECTROMECHANICAL DEVICE UTILIZING NONLINEAR ELEMENTS
10 Claims, 10 Drawing Figs.

[52] U.S. Cl. .................................... 310/12,
310/29, 318/135
[51] Int. Cl. ...................................... H02k 33/16
[50] Field of Search........................... 310/12-15,
17, 18, 19, 21, 25, 27, 29, 32; 318/133, 135, 22,
38; 335/227, 234, 219, 255, 253, 229; 336/110,
30; 267/69, 70, 73

[56] References Cited
UNITED STATES PATENTS

| 3,433,983 | 3/1969 | Keistman et al. | 310/12 X |
|---|---|---|---|
| 2,915,681 | 12/1959 | Troy | 335/229 X |
| 2,989,666 | 6/1961 | Brenner et al. | 310/12 X |
| 3,420,429 | 1/1969 | Ray | 335/234 X |
| 3,153,735 | 10/1964 | Brenagan et al. | 310/15 |
| 3,070,024 | 12/1962 | Romberg | 310/18 X |
| 3,495,147 | 2/1970 | Flora | 318/135 |

*Primary Examiner*—Milton O. Hirshfield
*Assistant Examiner*—B. A. Reynolds
*Attorneys*—Harry Kotlar and Lewis B. Sternfels

ABSTRACT: A linear motion electromagnetic device has a nonlinear spring to establish a spring force armature position characteristic proportionally opposite to a magnetic force armature position characteristic established by a permanent magnet. An electromagnetic coil is energized to control the position of the armature.

PATENTED SEP 14 1971

LINEAR MOTION ELECTROMECHANICAL DEVICE UTILIZING NONLINEAR ELEMENTS

The present invention relates to a device for linearly moving an armature by use of the force fields of a permanent magnet and an electromagnet and the bias of a spring. In particular, the nonlinear shape of the force fields, in combination with the effects of the armature gap, is taken in conjunction with the force of a spring having nonlinear characteristics, that is, the characteristics of the spring are selected to match, balance, offset, or otherwise affect, in a desired manner, the attractive magnetic forces exerted upon the armature as the armature moves towards and away from a magnet between the ends of its stroke. By so selecting a desired spring characteristic and by selecting appropriate arrangements of a permanent magnet and an electromagnet, the present invention may be configured to operate in one of several modes, including an off-on mode and vice versa, a minimum power mode, a maximum driving force mode, proportional modes wherein the armature position is dependent upon the current in the electromagnet coil or where the force output is made proportional to the input current in the electromagnet coil, and in a latching mode. By even slight changes or modifications of one or more of the constituent parts of the device by a user, the mode of operation can be easily changed.

Prior art devices of the type disclosed have been directed to the relationship between permanent-magnetic forces and electromagnetic forces rather than to the cooperation of these two forces with respect to particular spring forces. For example, U.S. Pat. Nos. 2,188,803; 2,278,971; 2,915,681; 3,253,098; and 3,432,782, show an armature which is normally attracted by a permanent magnet against the bias of a spring whose attractive force is less than the permanent-magnet force. The permanent-magnetic force is reduced upon arousal of an electromagnetic force operating in a direction tending to buck the permanent-magnetic force. U.S. Pat. Nos. 3,022,450 and 3,119,940 utilize springs simply as a means to center or particularly position an armature. U.S. Pat. Nos. 2,888,290 and 3,281,739 simply show a means for moving an armature towards or away from a permanent magnet by use of an electromagnet, the former employing a spring to aid the electromagnet. In none of the prior art patents is the spring, when one is used, the electromagnet and the permanent magnet, matched to obtain maximum utilization of the device for which it is intended.

In some of the prior art, as well as in the present invention, the initial flux density of the permanent magnet passes through the armature to produce an initial attractive force between the armature and the permanent magnet pole, which force is proportional to the square of the initial flux density. This force is balanced by the bias of a spring which is tensioned or compressed to exert a preload force on the armature in a direction opposite to the force of the permanent magnet. Assuming the armature to be in initial contact with a pole of the permanent magnet, if current is now supplied to the coil of the electromagnet so as to create an electromagnetic flux in the direction opposite from that of the permanent-magnet flux, a new decreased attractive force is created which new force is proportional to the square of the new but decreased flux density. The electromagnetic force is designed such that the new total force now is less than the force of the spring so as to permit movement of the armature away from the magnets.

In the corollary to this operation, the armature is initially at its farthest displacement from the permanent magnet whose attractive force is less than that of the spring. The electromagnet is so constructed, or the currents supplied thereto are so directed, that the electromagnetic flux passes in the same direction as the flux of the permanent magnet such that there is created a new augmented attractive force which is proportional to the square of the new flux density. The two magnetic forces are designed to be greater in combination than that of the spring to permit movement of the armature toward the magnets.

In the prior art relating to the above, the configuration of the spring and the particular placement of the electromagnet and the armature with respect to the permanent magnet had not been taken into consideration.

With respect to the placement of the armature, the present invention, on the other hand, recognizes the fact that, as the armature moves towards or away from the permanent magnet, the dimension of gap existing therebetween and the force exerted on the armature varies in a nonlinear manner. The spring utilized in the present invention, according to one embodiment thereof, is provided with a particular nonlinear spring characteristic. If the spring armature gap is provided with a force-displacement characteristic which is numerically equal to but opposite in sign to that of the permanent-magnet armature gap force-displacement characteristic, the armature can be caused to move in the presence of an electromagnetic coil current with optimum work output.

If the spring is formed to provide, with the armature, a characteristic which passes through a family of permanent-magnet—electromagnet characteristics obtained by utilizing means to vary the current furnished the electromagnet, the armature can be caused to move to any particular position in proportion to the amount of current furnished to the electromagnet.

The spring characteristic in another embodiment can also be designed in a manner such that the spring force is less than that of the permanent magnet when the armature is in contact with the permanent magnet and greater than the permanent-magnet force when a gap exists between the two elements. The electromagnetic force is designed to operate in a direction opposite from that of the permanent magnet. Upon supply of electromagnetic current, the armature moves away from the permanent magnet and, even if the electromagnet current is then shut off thereafter, the armature will not move back into contact with the permanent magnet. To obtain movement of the armature back onto contact with the permanent magnet, the electromagnetic coil may be energized in such a manner, by reverse direction of currents supplied thereto, to augment the attractive force of the permanent magnet.

The electromagnet, according to still another embodiment in the present invention, is placed in only a particular portion of the flux path of the permanent magnet. Here, the flux path of the permanent magnet is assumed to flow in a closed circuit which includes the armature. The electromagnet is placed only in one portion of this path. Since it is known that all materials have a certain coefficient of permeability, the material has a susceptibility of carrying a particular magnetic flux. For a given material of cross-sectional area, there is a maximum capability of the material for carrying magnetic flux. Beyond this maximum, further flux cannot be carried. Therefore, by increasing the flux lines of the electromagnet, there comes a point wherein the particular portion of the material becomes saturated to effectively prevent passage therethrough of the flux lines of the permanent magnet. By controlling the current passing through the electromagnet, the number of electromagnetic flux lines can also be controlled which, in turn, controls the extent of saturation of that particular portion of the circuit. Therefore, this embodiment acts as an amplifier or valve and is independent of the direction in which any of the magnetic flux lines travel.

It is, therefore, an object of the present invention to provide an improved linear motion device.

Another object is the provision of a device wherein the force relationships among a permanent magnet, an electromagnet, and a spring, all acting upon a movable element, are maximized.

Another object is to provide such a device whose mode of operation is easily changed either during fabrication or thereafter.

Another object is the provision of such a device having an optimum work output.

Another object is to provide such a device for holding an element at either end of its stroke.

Another object is the provision of such a device having an element which may be positioned in any one of a plurality of discrete positions between the ends of its stroke.

Another object is the provision of a magnetic amplifier.

Other aims and objects as well as a more complete understanding of the present invention will appear from the following explanation of exemplary embodiments and the accompanying drawings thereof, in which.

Figure 1:
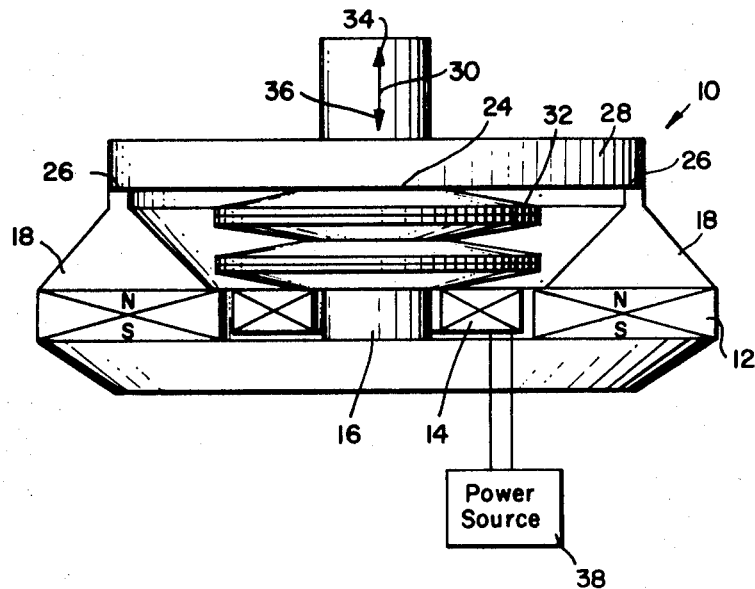
FIG. 1 is a view of a first embodiment of the present invention.

Accordingly, with reference to FIG. 1, an apparatus 10 includes a permanent magnet 12, preferably of annular shape, and an electromagnet 14, also of annular shape, both positioned about a core 16. The core is in contact with one face of the magnets and acts as an inner pole. An outer pole 18 is formed in contact with the other face of permanent magnet 12. Poles 16 and 18 are formed of a magnetic material of high permeability and terminate at pole faces 24 and 26, respectively, of poles 16 and 18. The assembly of the poles and the permanent magnet are contiguous to maximize the magnetic flux paths. An armature 28 of magnetic material is positionable upon pole faces 24 and 26 and is linearly movable as represented by arrow 30. A spring 32, depicted as a Belleville spring washer, is concentrically positioned about core 16 between the armature and permanent magnet 12 to exert a nonlinear force upon the armature for movement thereof in the direction of arrow tip 34. Although shown as a Belleville washer, other nonlinear springs, such as conical or variable-pitch springs may be used. The permanent magnet exerts an attractive force on the armature in the direction of arrow tip 36. The electromagnet is powered by a power source 38.

Figure 2:
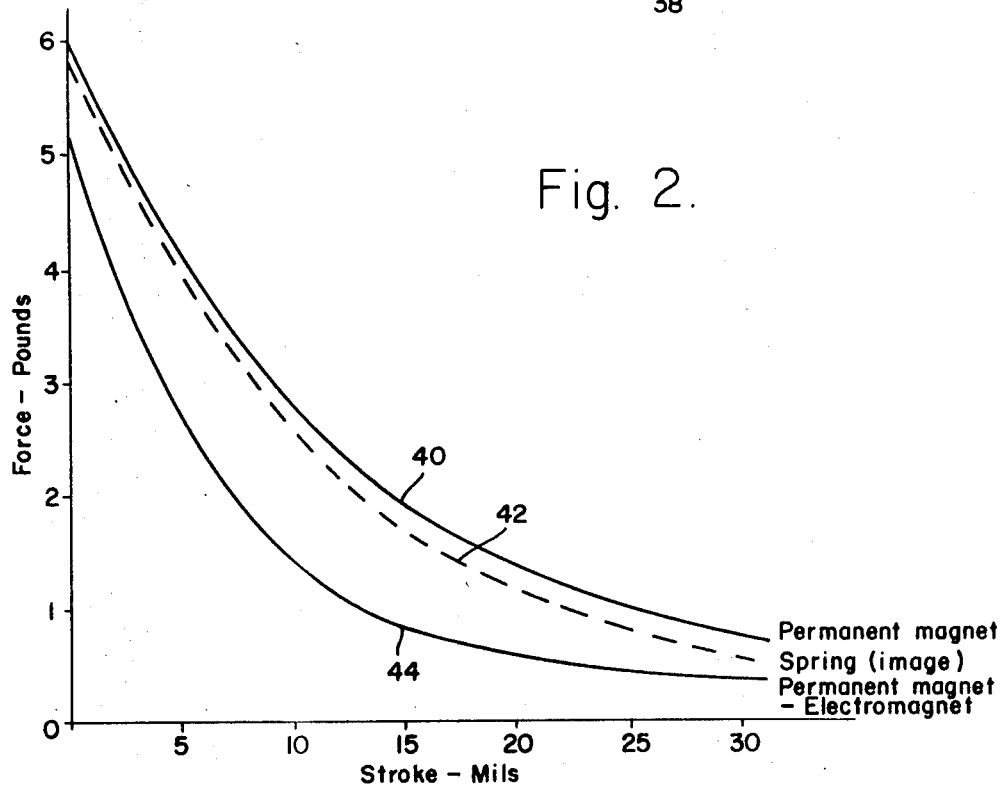
FIG. 2 is a force-stroke plot of the operation of the device depicted in FIG. 1 in a first mode.

One mode of operation of the FIG. 1 apparatus is depicted in FIG. 2 wherein the force-stroke or force-displacement characteristics of the permanent magnet are depicted by curve 40, the spring force-stroke characteristics are depicted by curve 42, the force-stroke characteristics of the permanent magnet and the electromagnet when acting in opposite directions is depicted by curve 44. For convenience, spring characteristic curve 42 is shown as a dashed curve to indicate that it is the image of the actual curve which would otherwise appear in the fourth quadrant which is below the stroke axis. Spring 32 is provided with force-stroke characteristics which essentially are numerically proportional but opposite in sign to those of the permanent magnet and, thus, the spring characteristics are hereinafter termed "proportionately opposite" to those of the permanent magnet. Therefore, for any specified force exerted by permanent magnet 12 on armature 28, there is a corresponding lesser but proportional force of spring 32 tending to move the armature away from pole faces 24 and 26.

In this embodiment, the permanent magnet normally attracts and holds the armature in contact with pole faces 26 and 28 against the bias of spring 32. When it is desired to cause movement of the armature in the direction of arrow tip 34, the electromagnet is energized in such a manner as to decrease the net magnetic force to that shown in curve 44, at which point, the total force is less than that of the spring, and armature 28 moves away from the permanent magnet. When it is desired to return the armature into contact with the pole faces, it is only necessary to cut off the current to the electromagnet which permits the magnet force to rise from a point on curve 44 back to a point on permanent-magnet curve 40 where the total attractive force exceeds that of the force exerted by spring 32. Armature 28 then moves in the direction of arrow tip 36.

Figure 3:
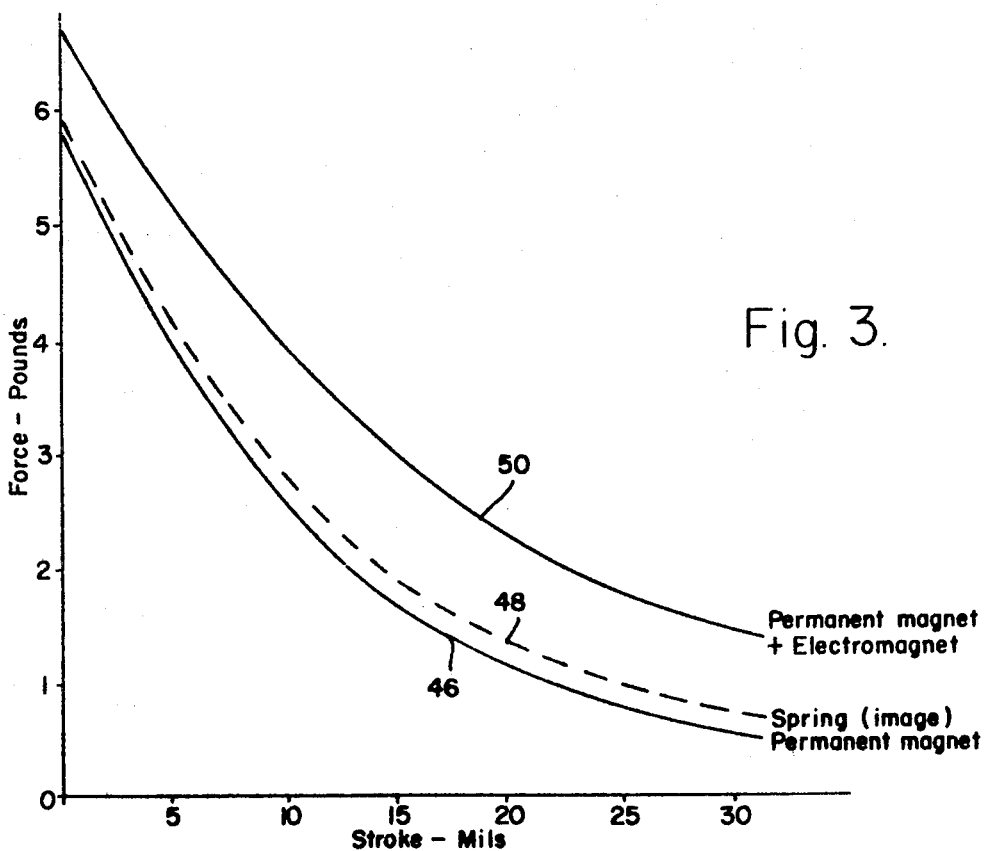
FIG. 3 is a force-stroke plot of the operation of the device of FIG. 1 in a second mode.

FIG. 3 depicts a mode of operation wherein armature 28 is normally spaced from pole faces 24 and 26, that is, where the force-stroke characteristics of permanent magnet 12 are less than those of spring 32. Therefore, permanent magnet curve 46 has absolute numerical values which are proportionately less than and "proportionately opposite" to those of spring force-stroke characteristics curve 48 (shown conveniently as a mirror image). When the electromagnet is energized, the electromagnetic force is caused to exist in the same direction as that of the permanent magnet in order to obtain a force-stroke curve 50 for both magnets 12 and 14. In this mode of operation, the armature is brought into contact with pole faces 24 and 26 only when the electromagnet is energized, thereby overcoming the force exerted by spring 32. To return the armature to its normally "open" position as depicted by arrow 34, the current to electromagnet 14 is cut off.

Figure 4:
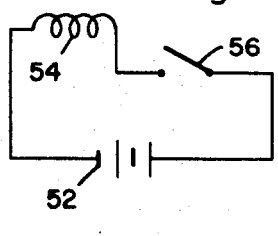
FIG. 4 is a schematic view of a circuit for controlling the embodiments of the present invention shown in FIGS. 1-3.

Both modes of operation can be accomplished by means of the circuit depicted in FIG. 4 which comprises a source of power 52 joined in series circuit with the coil 54 of electromagnet 14 by a switch 56. Closure of switch 56 will energize coil 54 to create an electromagnetic force in electromagnet 14.

Figure 5:
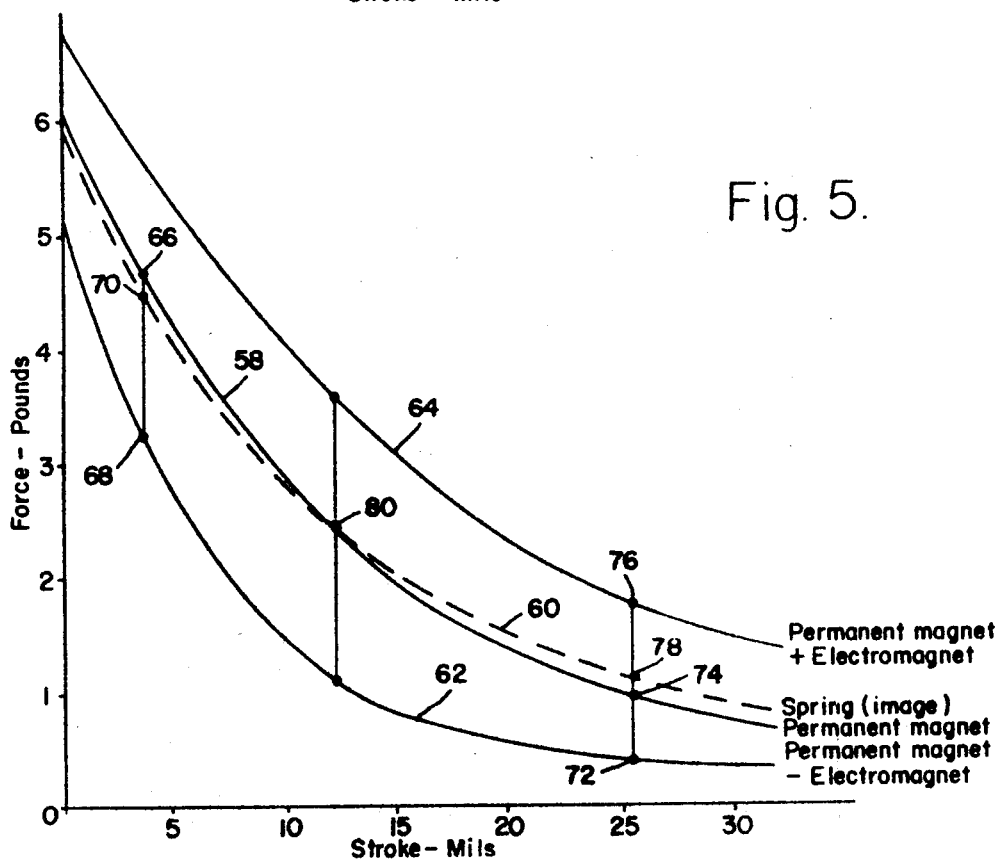
FIG. 5 is a force-stroke plot of the operation of the invention as a latching device, with reference to FIG. 1.

A third embodiment of the invention relates to use of device 10 as a latching mechanism and is depicted with reference to FIG. 5. In this embodiment, the force-stroke characteristics of permanent magnet 12 are depicted by curve 58, the force-stroke characteristics of spring 32 are depicted as dashed curve 60 (again illustrated as the mirror image of the actual curve and, therefore, "proportionately opposite"), the force-stroke characteristics of the permanent magnet decreased by the electromagnet are shown in curve 62, and the force-stroke characteristics of the permanent magnet augmented by the electromagnet are shown in curve 64. In this embodiment, armature 28 is normally at its closest position with respect to pole faces 24 and 26 and this position may be illustrated as being at point 66 on curve 58. At this point, the force of the permanent magnet attracting the armature is greater than that of the spring tending to bias the armature in the direction of arrow 34.

Upon energization of the electromagnet to create a flux bucking that of the permanent magnet, the net force drops towards a point 68 on curve 62 through a point 70 on spring curve 60. As soon as the new magnetic force drops below the amount of force exerted by this spring, at point 70, the armature moves away from its initial position and assumes a new position at its maximum stroke as indicated by point 72 on curve 62. At this time, the current to electromagnet 14 may be cut off and the armature will remain at the end of its stroke at point 72 because the permanent magnet force is below that of the spring, as depicted by point 74 on curve 58.

To obtain return of the armature into its initial position closest to the pole faces, it is necessary to augment the force of the permanent magnet which may be accomplished by reversing polarity of the current delivered to the electromagnet so as to obtain an increased magnetic force. Such supply of current raises the total magnetic force towards a point 76 on curve 64 through a point 78 on spring curve 60. This total attractive magnetic force reduces the gap between the armature and the pole faces. A shut off of electromagnet current returns the system to its original condition, that is, the force of the permanent magnet now resides at point 66 on curve 58. An inspection of FIG. 5 shows that there is a point 80 on both curves 58 and 60 at which the permanent-magnetic force is equal to the spring force. To the left of this point, the permanent-magnetic force exceeds the spring force while toward the right of point 80 the spring force exceeds that of the electromagnet.

Figure 6:
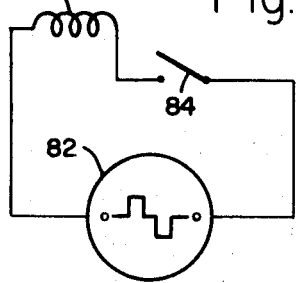
FIG. 6 is a schematic view of a circuit for controlling the FIG. 5 embodiment.

Operation of the latching embodiment may be seen with reference to FIG. 6 which depicts a pulse generator 82 connected in series with coil 54 of the electromagnet and a switch 84. Upon closure of switch 84, the electromagnet coil may be caused to obtain a flux in the direction of or opposite to that of the permanent magnet. Selective use of the pulse generator permits use of the operation previously described.

Figure 7:
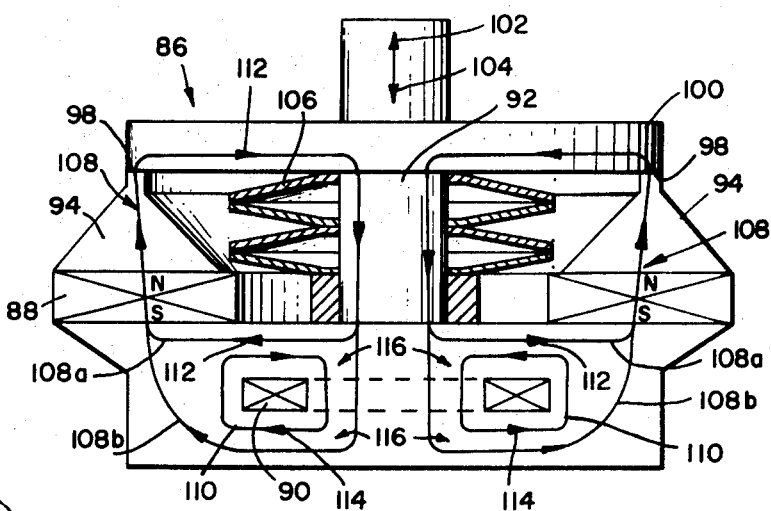
FIGS. 7 and 8 are schematic views of still further embodiments of the present invention acting as an amplifier.

Referring now to FIG. 7, apparatus 86 includes the same elements as those depicted in FIG. 1 comprising a permanent magnet 88, an electromagnet 90, an inner pole 92 and an outer pole 94, having pole faces 96 and 98, an armature 100 movable outwardly from the outer pole member as indicated by arrowhead 102 and inwardly toward the poles as indicated by arrow head 104. A nonlinear spring 106, such as a conical or variable-pitch spring or a series of Belleville washers, is positioned between the armature in the direction of arrowhead 102. In this embodiment, the relationship of all elements is the same as that of FIG. 1 with the exception of electromagnet 90 which is spaced from permanent magnet 88 so that the respective flux lines 108 and 110 of the permanent and electromagnets do not fully coincide. Permanent magnet flux lines 108 are divided into paths 108a and 108b and flow in the direction, for example, of arrows 112. The electromagnet flux lines travel in the directions of arrows 114.

In operation, the magnetic force of the permanent magnet maintains armature 100 in contact with pole faces 96 and 98 against the bias of spring 106. When electromagnet 90 is energized, its flux lines 110 reduce those of the permanent magnet to reduce the force of the permanent magnet and permitting the force of the spring to move the armature away from the poles. In this embodiment, however, reduction of permanent-magnet flux lines 108b tends to occur by means of the saturation of a portion 116 of inner pole 92. Since all magnetic materials have a coefficient of permeability which reflects the degree or extent by which the material is susceptible of carrying a magnetic flux, for a given material of cross-sectional area, there is a maximum capability of the material for carrying magnetic flux. Beyond this maximum, the material cannot further carry flux. Therefore, when magnetic flux lines 110 of electromagnet 90 become sufficiently large, portion 116 of pole 92 becomes saturated and the flux lines of the permanent magnet passing through this portion are reduced. The force of the permanent magnet is thereby reduced to permit spring 106 to move armature 100 away from the poles. Consequently, in this embodiment, the direction of path of the electromagnetic flux lines tends to be independent of its ability to reduce the effect of the permanent-magnet flux. As such, the device of FIG. 7 thereby acts, in part, as an amplifier.

Operation of the invention as a full amplifier is described with reference to FIG. 8 which comprises a permanent magnet 118, an electromagnet 120, an inner pole 122 and an outer pole 124, having pole faces 126 and 128, an armature 130 movable in the direction of arrow heads 132 and 134, and a spring 136. The flux of the permanent magnet is represented by lines 138 while the flux lines of the electromagnet are represented by lines 140. As shown, the electromagnet is placed entirely within portion 142 of inner pole 122 in order to obtain complete saturation thereof.

Figure 8:
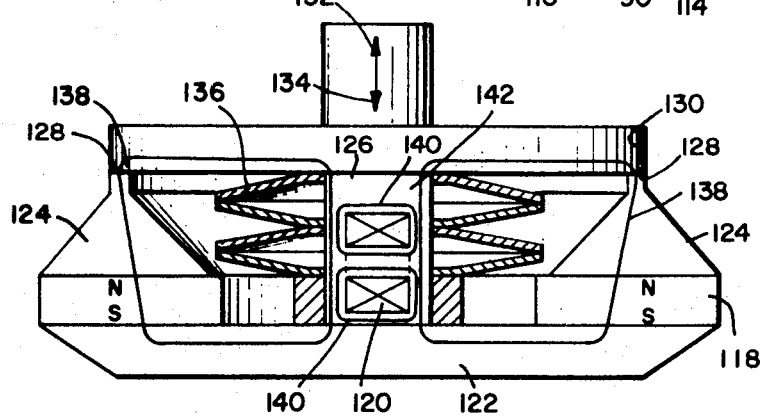
Figure 9:
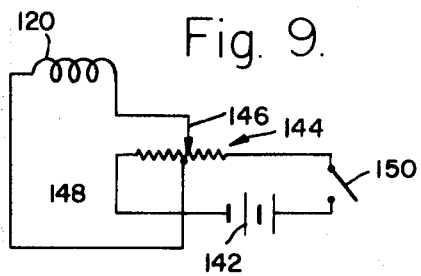
FIG. 9 is a schematic view of a circuit for controlling the embodiments depicted in FIG. 7 and FIG. 8.

In operation, the FIG. 8 apparatus acts as an amplifier exclusively in that, by saturating inner pole portion 142, no cancellation occurs in the flux lines of permanent magnet 118 by those of the electromagnet. In addition, the current passing through the electromagnet can be controlled, such as by use of the circuit shown in FIG. 9 in order to control the number of electromagnetic flux lines 140. In the circuit, a source of power 142 is connected through a potentiometer 144 to electromagnet 120. The potentiometer includes a pair of movable contacts 146 and 148 by which a selected amount of power may be furnished to the electromagnet. When the number of electromagnetic flux lines is below the saturation point of pole portion 142, the flux lines 138 of permanent magnet 118 are permitted to pass through the inner pole to the extent that there is not full saturation. The result of the control of the current in electromagnet 120 is to control the force exerted by the permanent magnet upon armature 130. Consequently, the embodiment depicted in FIG. 8 acts completely as an amplifier or a valve.

Figure 10:
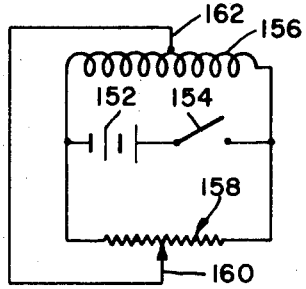
FIG. 10 is a circuit diagram for obtaining proportional movement of the armature of FIG. 1.

FIG. 10 depicts a circuit diagram for use of the electromagnet with differential coil operation. In this circuit, a source of power 152 is connected in the circuit by means of a switch 154 both to an electromagnetic coil 156 and to a potentiometer 158. Polarity of current in the electromagnet is obtained by movement of the contact 160 of the potentiometer as well as by particular placement of a coil contact 162, which is preferably fixed according to the particular use of the device. For example, the circuit of FIG. 10 is useful with the latching mechanism depicted in FIG. 5 and the amplifying devices of FIGS. 7 and 8 so as to obtain the desired control over electromagnetic flux lines.

This circuit of FIG. 10 can also be used to obtain proportional movement of armature 28 of FIG. 1, taken, for example, with the plot similar to that of FIG. 5 having a family of magnet curves all intersected by the spring curve. At any particular current furnished to electromagnet 14, a particular point on one of the family of permanent-magnet—electromagnet curves, such as curve 62, can be obtained such that there will be a point, such as point 80, where the magnetic and spring forces are balanced. Thus, armature 28 can be positioned at any position between the ends of its stroke.

Although the invention has been described with reference to particular embodiments thereof, it should be realized that various changes and modifications may be made therein without departing from the spirit and scope of the invention.

What is claimed is:

1. A linear motion device comprising an armature of magnetic material movable to a plurality of positions along a linear path, a permanent magnet having a strong magnetic force acting on said armature to cause attraction thereof in a direction towards said permanent magnet, the attraction of the magnetic force on said armature decreasing as the distance of said armature increases from said permanent magnet to establish a magnetic force-armature position characteristic, a nonlinear spring contacting said armature and exerting a force thereon to bias said armature in a direction away from said permanent magnet, the force of said spring on said armature decreasing as the distance of said armature increases from said permanent magnet to establish a spring force-armature position characteristic, said spring having a construction such that the second-mentioned characteristic is proportionally opposite to the first-mentioned characteristic, and an electromagnet coupled to said permanent magnet and connected to a source of electrical power having an electromagnetic force for acting in conjunction with the permanent-magnetic force.

2. A device as in claim 1 wherein the permanent-magnetic force is proportionally stronger than the spring force and wherein said electromagnet is provided with means for causing the electromagnetic force to exist in a direction opposite to the permanent-magnetic force and at a value sufficiently high to reduce the permanent-magnetic force below that of the spring force in order to cause movement of said armature away from said permanent magnet.

3. A device as in claim 1 wherein the spring force is proportionally stronger than the permanent-magnetic force and wherein said electromagnet is provided with means for causing the electromagnetic force to exist in the same direction as the permanent-magnetic force and at a value sufficiently high to augment the permanent-magnetic force to a value greater than that of the spring force to cause movement of said armature towards said permanent magnet.

4. A device as in claim 1 further including a potentiometric circuit coupled between said electromagnet and said source of electrical power and wherein the permanent-magnetic force is proportionally stronger than the spring force and said electromagnet is provided with means for causing the electromagnetic force to exist in a direction opposite to the permanent-magnetic force, said potentiometric circuit having power varying means capable of causing the electromagnetic force to exist at values sufficient to reduce the permanent-magnetic force attraction on said armature sufficient to balance the spring force at a specific one of the armature positions.

5. A device as in claim 1 wherein the spring force is stronger than the permanent-magnet force at one of the armature positions and weaker than the permanent-magnet force at another of the armature positions and wherein said electromagnet includes means for causing the electromagnetic force to exist selectively in a first direction opposite to that of the permanent magnetic force and in a second direction the same as that of the permanent-magnetic force, the electromagnetic force having a sufficiently high value in the first and second directions respectively to reduce the permanent magnetic force below the spring force at the one armature position and to augment the permanent-magnetic force above the spring force at the other armature position.

6. A device as in claim 1 further including poles of magnetic material extending from said permanent magnet, said armature positioned at said poles and providing a closed path for the flux of said permanent magnet, and said electromagnet positioned in one portion of the path in said poles, said electromagnet capable of producing a flux sufficient to saturate said portion of said poles to decrease and to effectively eliminate the permanent-magnet force.

7. A device as in claim 1 wherein said spring is selected from the group consisting of Belleville washers, conical springs, and variable-pitch springs.

8. A linear motion device having an axis comprising
an annularly shaped permanent magnet coaxially positioned on the axis and having a pair of poles, said poles having faces extending in the same direction,
an annularly shaped electromagnet secured to said permanent magnet and positioned in the plane of said permanent magnet and coaxially positioned along the axis,
a source of power connected to said electromagnet for energization thereof,
an armature of ferromagnetic material positioned over said poles, and
a nonlinear spring positioned between said armature and said magnets and exerting a force tending to bias said armature away from said pole faces,
said permanent magnet producing a magnetic flux and force lines in a first direction through said poles and attracting said armature towards said pole faces to form a completely closed magnetic flux path, the force of said permanent magnet being greater than the force of said spring, and said electromagnet capable of producing force lines upon energization thereof in a direction opposite to the direction of the permanent magnet force lines, the force of said electromagnet being sufficient to decrease the permanent magnet force to a value below that of said spring to permit movement of said armature away from said pole faces.

9. A linear motion device having an axis comprising
an annularly shaped permanent magnet coaxially positioned on the axis and having a pair of poles, said poles having faces extending in the same direction,
an annularly shaped electromagnet secured to said permanent magnet,
a source of power connected to said electromagnet for energization thereof,
an armature of ferromagnetic material positioned over said pole faces, and
a nonlinear spring positioned between said armature and said magnets exerting a force tending to bias said armature away from said pole faces,
said permanent magnet producing a magnetic flux in a first path through said poles and a force attracting said armature towards said pole faces, the force of said permanent magnet being greater than the force of said spring, and said electromagnet capable of producing a flux upon energization thereof in at least a portion of said poles and a portion of the first path of the permanent magnet flux, the flux of said electromagnet being sufficient to cause saturation of the common portion of said poles to reduce the force of said permanent magnet to permit movement of said armature away from said pole faces.

10. A linear motion device having an axis comprising
an annularly shaped permanent magnet coaxially positioned on the axis and having a pair of poles, said poles having faces extending in the same direction,
an annularly shaped electromagnet secured to said permanent magnet,
a source of power connected to said electromagnet for energization thereof and means coupled between said electromagnet and said power source for varying the amount of current furnished to said electromagnet,
an armature of ferromagnetic material placed over said pole faces, and
a nonlinear spring positioned between said armature and said magnets exerting a force tending to bias said armature away from said poles to provide, with said armature a spring-armature displacement force-stroke characteristic,
said permanent magnet producing a magnetic flux in a first direction through said poles and a force attracting said armature towards said pole faces and providing a permanent-magnet armature displacement force-stroke characteristic, the force of said permanent magnet being greater than the force of said spring, and said electromagnet capable of producing fluxes of different values in response to supply of the current in a direction opposite to the direction of the permanent magnet flux so as to provide, with the second-mentioned force-stroke characteristic, a plurality of electromagnet—permanent magnet armature displacement force-stroke characteristics, the first-mentioned characteristic passing through all the third-mentioned characteristics to establish a plurality of magnet-spring balance points, said means capable of establishing a value of the current for each of the balance points to permit movement of said armature away from said pole faces to a plurality of positions.